(12) United States Patent
Wobak et al.

(10) Patent No.: US 11,784,681 B2
(45) Date of Patent: Oct. 10, 2023

(54) COMMUNICATION DEVICE AND OPERATING METHOD

(71) Applicant: NXP B.V., Eindhoven (NL)

(72) Inventors: Markus Wobak, Graz (AT); Ulrich Neffe, Albersdorf-Prebuch (AT)

(73) Assignee: NXP B.V., Eindhoven (NL)

( * ) Notice: Subject to any disclaimer, the term of this patent is extended or adjusted under 35 U.S.C. 154(b) by 385 days.

(21) Appl. No.: 17/207,839

(22) Filed: Mar. 22, 2021

(65) Prior Publication Data

US 2021/0314028 A1 Oct. 7, 2021

(30) Foreign Application Priority Data

Apr. 3, 2020 (EP) .................................... 20167897

(51) Int. Cl.
*H04B 5/00* (2006.01)
*H04B 7/00* (2006.01)
(Continued)

(52) U.S. Cl.
CPC ......... *H04B 5/0037* (2013.01); *H04B 5/0062* (2013.01)

(58) Field of Classification Search
None
See application file for complete search history.

(56) References Cited

U.S. PATENT DOCUMENTS 8,374,546 B2 * 2/2013 Maugars ............... H04W 88/06
455/41.1
8,983,374 B2 * 3/2015 Wiley ................... H04B 5/0037
455/41.1

(Continued)

FOREIGN PATENT DOCUMENTS

CN 107547103 A 1/2018
EP 2683090 A2 1/2014
(Continued)

OTHER PUBLICATIONS

U.S. Appl. No. 17/158,081, filed Jan. 26, 2021; Inventors: Markus Wobak, et al.; Title: "Communication Device And Method For Operating The Same."
NFC Forum—ISO/IEC 14443 Analog, Parameter Comparison and Alignment, Methodology, Procedures and Results, Version: 1.5, Date: Jan. 19, 2017, 148 pages.

*Primary Examiner* — Tuan A Tran

(57) ABSTRACT

In accordance with a first aspect of the present disclosure, a communication device is provided, comprising: a first antenna configured to receive and transmit a first set of near field communication (NFC) signals, wherein said first set of NFC signals relates to NFC transactions; a second antenna configured to receive and transmit a second set of NFC signals, wherein said second set of NFC signals relates to wireless charging operations; a controller; a first interface between the controller and the first and second antenna, the first interface comprising an antenna selection unit configured to select the first antenna or the second antenna in response to a selection signal received from said controller; a second interface between the controller and the first antenna; wherein the controller is configured to detect whether an external communication device is within communication range of the first antenna using the second interface. In accordance with a second aspect of the present disclosure, a corresponding method for operating a communication device is conceived.

20 Claims, 7 Drawing Sheets

(51) Int. Cl.
*H04B 1/38* (2015.01)
*H02J 5/00* (2016.01)
*H01Q 1/24* (2006.01)
*G06K 19/07* (2006.01)

(56) References Cited

U.S. PATENT DOCUMENTS

| | | | | |
|---|---|---|---|---|
| 9,042,816 B2* | 5/2015 | Frankland | | G06K 19/0726 |
| | | | | 455/193.1 |
| 9,106,268 B2* | 8/2015 | Luong | | H04W 4/80 |
| 9,240,824 B2* | 1/2016 | Hillan | | H04B 5/00 |
| 9,419,465 B2* | 8/2016 | van Lammeren | | H02J 50/40 |
| 9,502,922 B2* | 11/2016 | Hasegawa | | H04B 5/0037 |
| 9,553,637 B2* | 1/2017 | Yang | | H04W 4/80 |
| 9,667,091 B2* | 5/2017 | Baek | | H02J 7/007 |
| 9,685,699 B2* | 6/2017 | Mahanfar | | H01Q 1/243 |
| 10,056,945 B2* | 8/2018 | Kim | | H04B 5/0037 |
| 10,079,621 B2* | 9/2018 | Lee | | H01Q 1/243 |
| 10,396,583 B2* | 8/2019 | Maugars | | H02J 7/025 |
| 10,707,703 B2* | 7/2020 | Noh | | H02J 50/12 |
| 10,756,562 B2* | 8/2020 | Kobayashi | | H04B 5/02 |
| 10,790,574 B2* | 9/2020 | Hao | | H04B 5/0031 |
| 10,826,333 B2* | 11/2020 | Chen | | H02J 7/345 |
| 10,931,151 B2* | 2/2021 | Baek | | H02J 50/70 |
| 10,944,446 B2* | 3/2021 | Hong | | H04B 1/3888 |
| 10,958,094 B2* | 3/2021 | Choi | | H02J 50/40 |
| 10,965,157 B2* | 3/2021 | Lee | | H04B 5/0056 |
| 10,997,483 B2* | 5/2021 | Rizzo | | H01Q 1/521 |
| 11,047,893 B2* | 6/2021 | Choi | | G06F 1/1698 |
| 11,600,923 B2* | 3/2023 | Konanur | | G06F 1/1698 |
| 11,641,221 B2* | 5/2023 | Lee | | H02J 50/90 |
| | | | | 307/104 |
| 2008/0272889 A1 | 11/2008 | Symons | | |
| 2012/0139358 A1* | 6/2012 | Teggatz | | H02J 50/12 |
| | | | | 307/104 |
| 2012/0149301 A1 | 6/2012 | Wiley | | |
| 2014/0273832 A1* | 9/2014 | Kim | | H02J 50/20 |
| | | | | 455/41.1 |
| 2015/0065041 A1* | 3/2015 | Ahn | | H04B 5/0037 |
| | | | | 455/41.1 |
| 2016/0190856 A1 | 6/2016 | Baek et al. | | |
| 2016/0365743 A1* | 12/2016 | Huang | | H02J 7/007192 |
| 2017/0098149 A1 | 4/2017 | Kesler et al. | | |
| 2017/0279495 A1* | 9/2017 | Kim | | H04B 5/0031 |
| 2020/0274394 A1* | 8/2020 | Rhee | | H02J 7/0029 |

FOREIGN PATENT DOCUMENTS

| | | |
|---|---|---|
| EP | 2683090 A3 | 6/2017 |
| EP | 3280005 A1 | 2/2018 |

* cited by examiner

COMMUNICATION DEVICE AND OPERATING METHOD

CROSS-REFERENCE TO RELATED APPLICATIONS

This application claims priority under 35 U.S.C. § 119 to European Patent Application No. 20167897.6, filed on Apr. 3, 2020, the contents of which are incorporated by reference herein.

TECHNICAL FIELD

The present disclosure relates to a communication device. Furthermore, the present disclosure relates to a corresponding method of operating a communication device.

BACKGROUND

Near field communication (NFC) is an established technology for proximity communication for various use cases. Using this technology, a primary device may generate a radio frequency (RF) field at a frequency of 13.56 MHz to power a secondary device. Modulation techniques are used to communicate in both directions. The secondary device may be a passive device (e.g. a tag or a transponder) or an active, typically battery-powered device. An RF field generated by an NFC reader can be used to charge the battery of the secondary device. This process is referred to as wireless charging. In such a scenario, the NFC communication channel may be used to control the charging operation.

SUMMARY

In accordance with a first aspect of the present disclosure, a communication device is provided, comprising: a first antenna configured to receive and transmit a first set of near field communication (NFC) signals, wherein said first set of NFC signals relates to NFC transactions; a second antenna configured to receive and transmit a second set of NFC signals, wherein said second set of NFC signals relates to wireless charging operations; a controller; a first interface between the controller and the first and second antenna, the first interface comprising an antenna selection unit configured to select the first antenna or the second antenna in response to a selection signal received from said controller; a second interface between the controller and the first antenna; wherein the controller is configured to detect whether an external communication device is within communication range of the first antenna using the second interface.

In one or more embodiments, the controller is configured to detect whether the external communication device is within communication range of the first antenna by detecting the presence of a radio frequency (RF) field.

In one or more embodiments, the controller is configured to conclude that the external communication device is within communication range of the first antenna if the strength of said RF field exceeds a predefined threshold.

In one or more embodiments, the controller is configured to detect whether the external communication device is within communication range of the first antenna by detecting a load change on the first antenna.

In one or more embodiments, the controller is further configured to generate and transmit radio frequency (RF) pulses through the first antenna, to detect said load change on the first antenna.

In one or more embodiments, the controller is configured to use a transmitter supply current as a measure of the load change.

In one or more embodiments, the controller is configured to interrupt an active wireless charging operation if said external communication device is within communication range of the first antenna.

In one or more embodiments, the controller is configured to interrupt said active wireless charging operation by instructing the antenna selection unit to select the first antenna.

In one or more embodiments, the controller is further configured to reactivate the interrupted wireless charging operation if the external communication device is no longer within communication range of the first antenna or if a transaction with the external communication device has concluded.

In one or more embodiments, the controller is configured to reactivate the interrupted wireless charging operation by instructing the antenna selection unit to select the second antenna.

In one or more embodiments, the first interface comprises a first matching circuit and the second interface comprises a second matching circuit.

In one or more embodiments, the communication device is a mobile device.

In accordance with a second aspect of the present disclosure, a method for operating a communication device is conceived, comprising: receiving and transmitting, by a first antenna, a first set of NFC signals, wherein said first set of NFC signals relates to NFC transactions; receiving and transmitting, by a second antenna, a second set of NFC signals, wherein said second set of NFC signals relates to wireless charging operations; selecting, by an antenna selection unit comprised in a first interface between a controller and the first and second antenna, the first antenna or the second antenna in response to a selection signal received from the controller; detecting, by the controller, whether an external communication device is within communication range of the first antenna using a second interface between the controller and the first antenna.

In one or more embodiments, said detecting comprises detecting the presence of a radio frequency (RF) field.

In one or more embodiments, said detecting comprises detecting a load change on the first antenna.

DESCRIPTION OF DRAWINGS

Embodiments will be described in more detail with reference to the appended drawings, in which.

DESCRIPTION OF EMBODIMENTS

Figure 1:
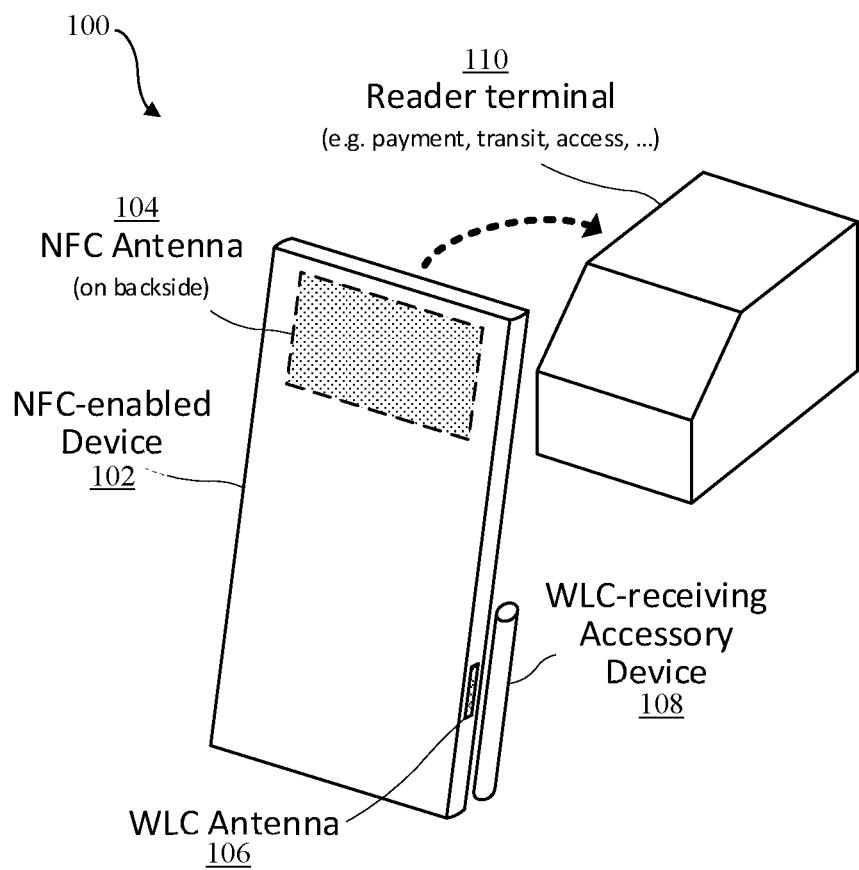
FIG. 1 shows an example of a communication system.

Near field communication (NFC) is an established technology for proximity communication for various use cases.

Using this technology, a primary device may generate a radio frequency (RF) field at a frequency of 13.56 MHz to power a secondary device. Modulation techniques are used to communicate in both directions. The secondary device may be a passive device (e.g. a tag or a transponder) or an active, typically battery-powered device. An RF field generated by an NFC reader can be used to charge the battery of the secondary device. This process is referred to as wireless charging. In such a scenario, the NFC communication channel may be used to control the charging operation.

Typical implementations of NFC direct wireless charging make use of a WLC-P (wireless charging poller) device and a WLC-L (wireless charging listener) device. The wireless charging poller may be a standalone reader device which is configured to charge the battery of the wireless charging listener, i.e. a secondary accessory device such as a watch or fitness tracker. The requirements for the antenna size and the placement of the antenna in wireless charging (WLC) use cases is often at odds with typical NFC use cases (such as NFC payment, ticketing, access or tag reading). Typical WLC accessory devices have a small form factor and require small WLC antenna sizes for a high-power efficiency. Thus, using a regular NFC antenna, such as an antenna used in a mobile phone, is typically not preferable. In other words, in addition to a regular NFC antenna, a reader (e.g., a mobile phone) should be equipped with a smaller antenna for wireless charging. Then, the reader should typically contain an additional controller, which increases the cost of the reader. Alternatively, a single controller may be connected to multiple antennas. In that case, the reader may further comprise an antenna selection unit configured to select one of said multiple antennas in response to a selection signal received from the controller.

Thus, basic standalone WLC-P implementations typically have a single antenna for WLC use cases. In contrast, general NFC devices and especially NFC-enabled mobile devices (such as mobile phones and tablets) can support WLC-P use cases in parallel to conventional NFC use cases (such as payment, ticketing, access control, and tag reading applications) with a single NFC controller connected to NFC and WLC antennas. Then, time multiplexing methods may be used to enable that only one antenna is actively connected to the NFC controller's radio frequency (RF) modem. Accordingly, an NFC controller's RF modem may be connected to multiple antennas, including NFC and WLC antennas. However, in that case, during an ongoing NFC Wireless Charging (WLC) activity, an NFC controller's RF modem may not be able to detect the presence of NFC communication counterparts which are within communication range of the regular NFC antenna, because the RF modem is connected to the WLC antenna.

As used herein, the term "WLC activity" refers to a scenario in which a primary device acts as a WLC-P to charge a WLC-L using a WLC antenna. Furthermore, the term "NFC activity" refers to a regular NFC communication using an NFC antenna. Such a regular NFC communication may relate to the execution of typical NFC transactions, including payment transactions and public transport ticket validations, which are carried out when an NFC-enabled mobile device (e.g., a phone) is within close proximity of an NFC-enabled terminal. Furthermore, such a regular NFC communication may relate to reading, by an NFC-enabled mobile device, data from an external NFC tag or transponder which is in close proximity of the mobile device.

The duration of typical WLC activities is between several minutes up to several hours. As a result, a WLC antenna may have to remain connected to the NFC controller's RF modem for a relatively long time. This also means that the NFC antenna may remain disconnected from the NFC controller's RF modem for a relatively long time, such that secondary devices (such as a terminal, tag or transponder) which are in proximity of the NFC antenna may remain undetected. Thus, NFC use cases may be precluded during the WLC activity. NFC use cases are typically performed with mobile devices; they may include payment, transit, access control—when the mobile device acts in a so-called card mode—and tag reading—when the mobile device acts in a so-called reader mode.

Unfortunately, a user of the mobile device may not be aware of the fact that NFC activities cannot be carried out during a WLC activity. It is noted that a user should often actively stop the WLC activity (by removal of the WLC-L device or by a software-based interaction) before an NFC activity can be performed. Examples of NFC activities include performing payment operations (such as a purchase of a coffee or a snack), transit operations (such as entering or leaving a public transport vehicle), performing a tag read operation (such as initiating a secondary RF link transaction, for example done with headsets or reading smart posters or contact cards), or mobile device to mobile device communication (such as NFC peer-to-peer communication).

FIG. 1 shows an example of a communication system 100 in which both near field communication operations and wireless charging operations are performed. The system 100 comprises an NFC-enabled device 102 which is able to operate in a so-called card mode. The system 100 also comprises a reader terminal 110, by means of which various types of transactions or applications may be executed, for example payment transactions, transit applications and access applications. In operation, the NFC-enabled device 102 may be brought into close proximity of the reader terminal 110. For this purpose, the NFC-enabled device 102 comprises an NFC antenna 104, which may for example be mounted on the backside of the device 102. To execute the aforementioned transactions or applications, user credentials, which may for example be stored in a secure element (not shown) of the device 102, may be transmitted to the reader terminal 110 via an NFC channel between the device 102 and the reader terminal 110. In addition, the NFC-enabled device 102 includes a wireless charging (WLC) antenna 106, by means of which an external accessory device 108 may be charged. As explained above, when the NFC-enabled device 102 performs such a wireless charging operation, it may not be able to detect the presence of a reader terminal 110 in its proximity.

Figure 2:
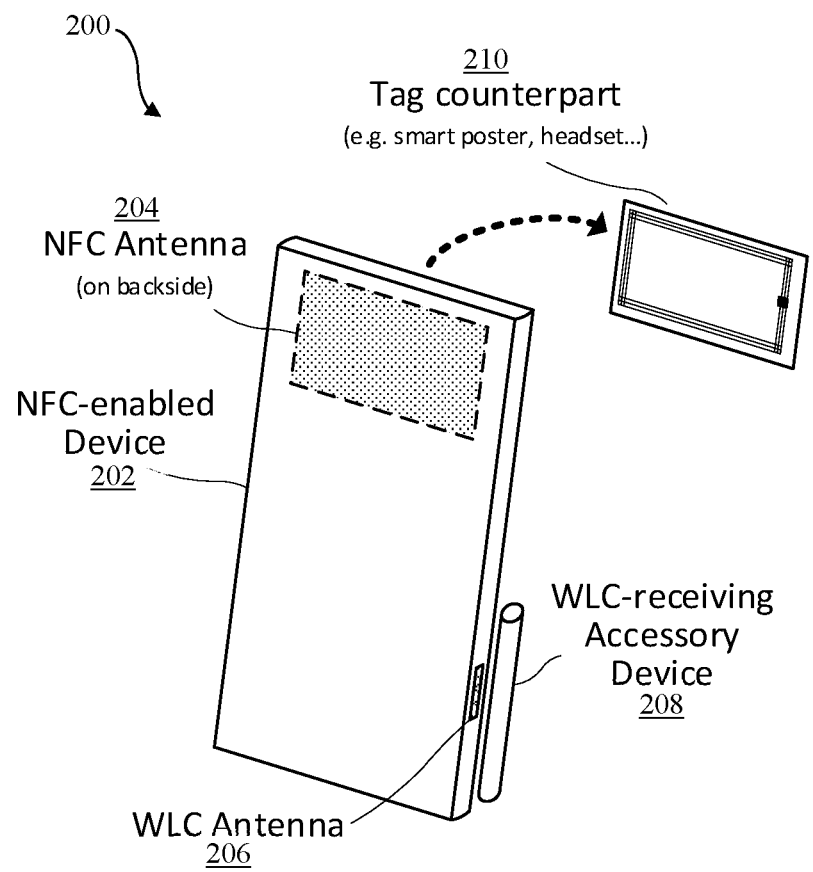
FIG. 2 shows another example of a communication system.

FIG. 2 shows another example of a communication system 200 in which both near field communication operations and wireless charging operations are performed. The system 200 comprises an NFC-enabled device 202 which is able to operate in a so-called reader mode. The system 200 also comprises a communication counterpart implemented as a tag 210, which is for example embedded in a smart poster or a headset. In operation, the NFC-enabled device 202 may be brought into close proximity of the tag 210. For this purpose, the NFC-enabled device 202 comprises an NFC antenna 204, which may for example be mounted on the backside of the device 202. By means of NFC, the device 202 may for example retrieve data from the tag 210, which may subsequently be processed in accordance with the application requirements. In addition, the NFC-enabled device 202 includes a wireless charging (WLC) antenna 206, by means of which an external accessory device 208 may be charged. As explained above, when the NFC-enabled device 202 performs such a wireless charging operation, it may not be able to detect the presence of a tag 210 in its proximity.

Now discussed are a communication device and a method of operating a communication device, which facilitate detecting the presence of an external communication device (e.g. a reader terminal or a tag) during a wireless charging (WLC) activity. It is noted that, although the embodiments described herein only include a single NFC antenna and a single WLC antenna, a plurality of NFC antennas and/or a plurality of WLC antennas may also be connected to a single NFC controller in a communication device of the kind set forth. Such configurations also fall within the scope of the appended claims.

Figure 3:
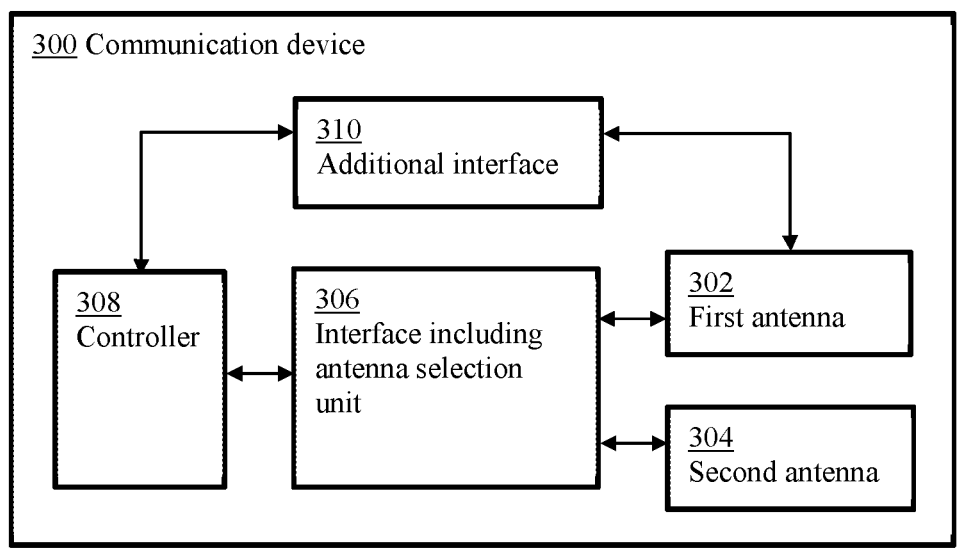
FIG. 3 shows an illustrative embodiment of a communication device.

FIG. 3 shows an illustrative embodiment of a communication device 300. The communication device 300 includes a first antenna 302 and a second antenna 304. The first antenna 302 is configured to receive and transmit a first set of NFC signals relating to NFC transactions. It is noted that the term "NFC transactions" refers to any type of operations which may be carried out using a regular NFC antenna, i.e. an NFC antenna which is not specifically designed for wireless charging operations, and which therefore does not need to meet stringent form factor requirements, for example. Examples of such NFC transactions include payment transactions and public transport ticket validations, which are carried out when an NFC-enabled mobile device (e.g., a phone) is within close proximity of an NFC-enabled terminal. Furthermore, the second antenna 304 is configured to receive and transmit a second set of NFC signals, wherein said second set of NFC signals relates to wireless charging operations. For instance, these signals may include signals for controlling a wireless charging operation, and signals which effectively transfer energy to an accessory device. Furthermore, the communication device includes a controller 308, an interface 306 between the controller 308 and the first and second antenna 302, 304, and an additional interface 310. The interface 306 includes an antenna selection unit 306, which is configured to select the first antenna 302 or the second antenna 304 in response to a selection signal received from the controller 308. Furthermore, the controller 308 is configured to detect whether an external communication device is within communication range of the first antenna 302 using the additional interface 310. By means of the additional interface 310 between the controller 308 and the first antenna 302, the detection of an external communication device in proximity of the first antenna is facilitated, in particular when a wireless charging operation is active (i.e., when the second antenna 304 is being used).

Figure 4:
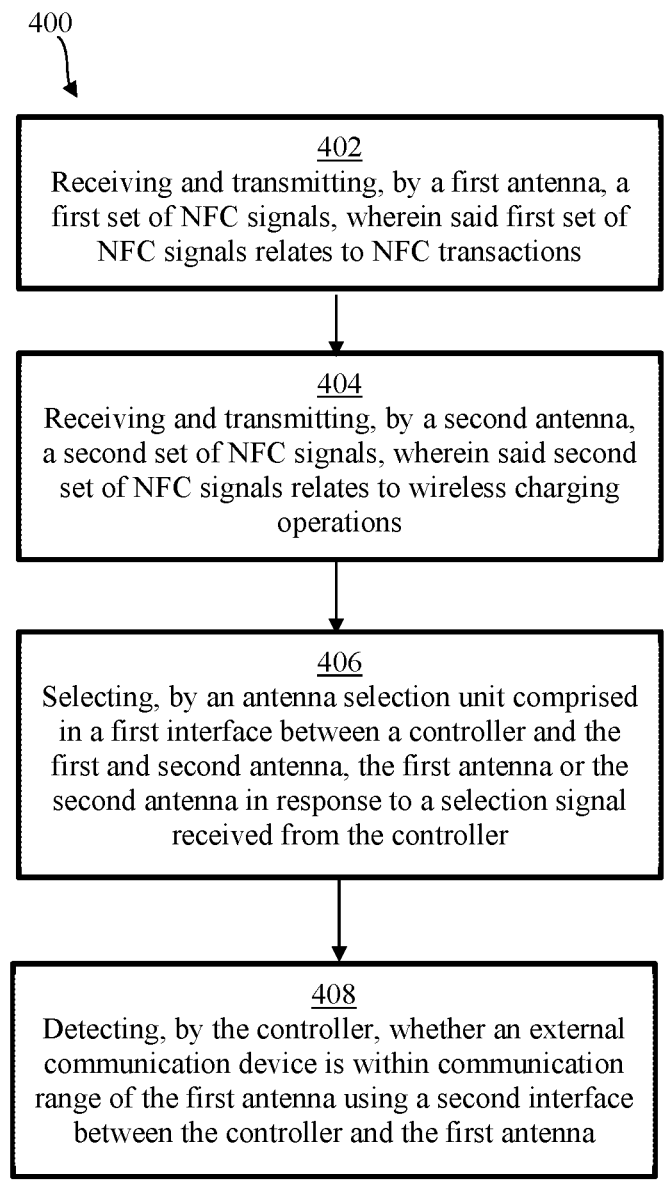
FIG. 4 shows an illustrative embodiment of a method of operating a communication device.

FIG. 4 shows an illustrative embodiment of a method 400 of operating a communication device. The method 400 comprises the following steps: at 402, receiving and transmitting, by a first antenna, a first set of NFC signals, wherein said first set of NFC signals relates to NFC transactions, at 404, receiving and transmitting, by a second antenna, a second set of NFC signals, wherein said second set of NFC signals relates to wireless charging operations, at 406, selecting, by an antenna selection unit comprised in a first interface between a controller and the first and second antenna, the first antenna or the second antenna in response to a selection signal received from the controller, and at 408, detecting, by the controller, whether an external communication device is within communication range of the first antenna using a second interface between the controller and the first antenna. As mentioned above, by using the second interface (i.e., the additional interface) between the controller and the first antenna, the detection of an external communication device in proximity of the first antenna is facilitated, in particular when a wireless charging operation is active (i.e., when the second antenna 304 is being used).

Thus, in accordance with the present disclosure, an NFC device may be equipped with a single NFC controller, which is connectable to a regular NFC antenna (i.e., a first antenna) and a WLC antenna (i.e., a second antenna). For this purpose, the NFC device comprises a first interface having a selection module (i.e., an antenna selection unit) and an additional, second interface, which may also be referred to as a sense interface. The sense interface provides RF sense functionality on the regular NFC antenna while the NFC controller's transceiver is connected to the WLC antenna, for example while the WLC antenna actively generates an RF field to perform a wireless charging operation. Through the sense interface, the NFC controller may sense the presence of an external NFC device which is in proximity of the NFC antenna (e.g., an external reader or NFC interrogator). Alternatively, or in addition, the NFC controller may sense, through the sense interface, the presence of other communication counterparts, for example tags or transponders, which may be passive devices, and other NFC target devices.

In one or more embodiments, the controller is configured to detect whether the external communication device is within communication range of the first antenna by detecting the presence of a radio frequency (RF) field. In this way, detecting an external reader or interrogator is facilitated. In a practical implementation, the controller is configured to conclude that the external communication device is within communication range of the first antenna if the strength of the RF field exceeds a predefined threshold. For instance, the NFC signal strength on the first antenna may be used as a metric. Alternatively, or in addition, a frequency-based metric may be used. For detecting the presence of an external RF field, the sense interface may include an additional receiver stage in the NFC controller, which may also be referred to as an RF sense receiver.

In one or more embodiments, the controller is configured to detect whether the external communication device is within communication range of the first antenna by detecting a load change on the first antenna. In this way, detecting an external tag or transponder is facilitated. Such an external transponder may be a so-called radio frequency identification (RFID) transponder. Nowadays, RFID transponders are widely used, in different areas of industry and commerce and for various purposes. RFID transponders may for example be embodied as so-called RFID tags or RFID cards. RFID transponders are often passive devices, which means that they do not have their own power source. Instead, they are powered by a field generated by a reader, and they respond to the reader by modulating the field. Thus, in this case, the communication device acts in a reader mode, i.e. it generates a field using its NFC antenna, by means of which the external device is powered. It is noted that RFID transponders are compatible with NFC devices in the sense that they are able to communicate at the same frequency, i.e. 13.56 MHz.

In order to detect the load change on the antenna, the sense interface may comprise an additional transmitter stage in the NFC controller, which may also be referred to as an RF sense transmitter. In one or more embodiments, the controller is further configured to generate and transmit RF pulses through the first antenna, to detect the load change. In this way, an external passive device may be detected without consuming a large amount of power. For example, such a pulse-based technique may include a low power card detection (LPCD) or a low power device detection (LPDD)

method for detecting the presence of a passive external device in proximity of the NFC antenna. In a practical implementation, the controller can for example be configured to use a transmitter supply current as a measure of the load change.

Thus, the NFC controller may be able to detect a load change by generating and transmitting short RF pulses using an additional, separate and basic transmitter stage in the NFC controller. Such a transmitter stage may be basic in the sense that is only capable, for example, of generating a continuous wave signal. Furthermore, the transmitter stage may be separate in the sense that it operates independently from the main transmitter stage of the NFC controller (i.e., the transmitter stage integrated in the NFC controller's transceiver). As a result, the additional transmitter stage has a negligible influence on the NFC controller's transceiver function. An additional NFC RF sense receiver matching unit may connect the additional transmitter stage to the NFC antenna. To save power, an LPCD or LPDD method may be applied, for sensing load changes relative to an initial reference measurement value. The transmitter supply current and/or the RF sense receiver interface signal may be used as a metric. In case the transmitter supply current is used, the transmitter current of consecutive RF sense pulses can be monitored. Then, if a significant change of the transmitter current is detected, a wakeup event may be triggered.

In one or more embodiments, the controller is configured to interrupt an active wireless charging operation if the external communication device is within communication range of the first antenna. In this way, the communication device may quickly initiate and perform an NFC transaction using the NFC antenna. In a practical implementation, the controller is configured to interrupt the active wireless charging operation by instructing the antenna selection unit to select the first antenna. Thus, in this way, the second antenna is effectively disconnected from the WLC antenna and connected to the NFC antenna. Furthermore, in one or more embodiments, the controller is further configured to reactivate the interrupted wireless charging operation if the external communication device is no longer within communication range of the first antenna or if a transaction with the external communication device has concluded. In this way, the wireless charging operation may be resumed quickly. In a practical implementation, the controller is configured to reactivate the interrupted wireless charging operation by instructing the antenna selection unit to select the second antenna.

Figure 5:
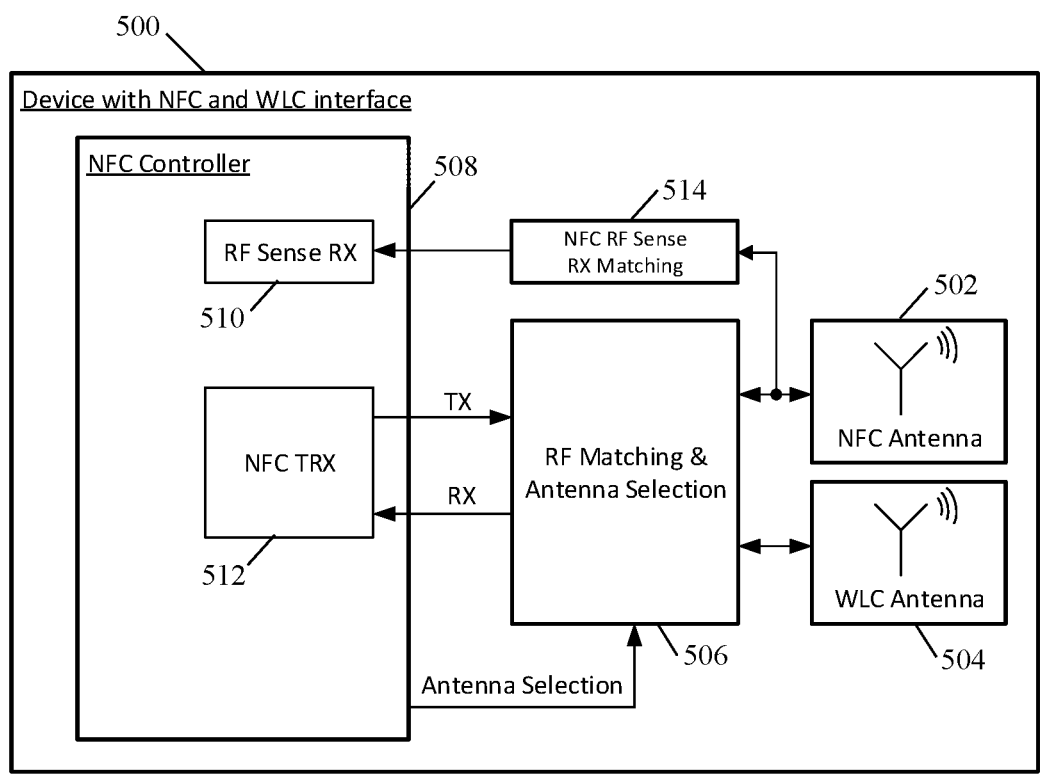
FIG. 5 shows another illustrative embodiment of a communication device.

FIG. 5 shows another illustrative embodiment of a communication device 500. The communication device 500 comprises an NFC antenna 502 and a wireless charging antenna 504. Furthermore, the communication device 500 comprises an NFC controller 508, which is connected to the NFC antenna 502 and the wireless charging antenna 504 through an RF matching and antenna selection unit 506. The NFC controller 508 comprises an NFC transceiver 512 configured to receive and transmit NFC signals to an external communication device (not shown), using the NFC antenna 502 and the wireless charging antenna 504. Furthermore, the communication device 500 comprises a sense interface, which in turn comprises a RF sense receiver stage 510 and an NFC RF sense receiver matching unit 514. The embodiment shown in FIG. 5 facilitates detecting whether an external communication device is within communication range of the NFC antenna 502 by detecting the presence of an RF field.

To support sensing on the NFC antenna 502 during a WLC activity, e.g. when the WLC antenna 504 is connected to the NFC RF modem (i.e., the NFC transceiver 512), the communication device 500 includes an additional interface from the NFC antenna 502 to the NFC controller 508. An interconnecting NFC RF sense matching unit 514 may be used to convert NFC antenna signals to a voltage or a current that can be sensed by the NFC controller 508. The sense interface's receiver stage 510 and interconnecting matching circuitry 514 may be designed such that it acts as a low load to the NFC antenna 502, in order to prevent that the NFC RF link performance is reduced. Upon detection of a communication counterpart on the NFC link (i.e., in the presence of the NFC antenna 502) during a WLC activity, the NFC controller 508 may interrupt an ongoing WLC activity by shutting off the WLC RF field, by connecting the NFC transceiver 512 to the NFC antenna 502 and by handling the detected counterpart in an appropriate manner (e.g., by performing reader mode or card mode NFC transactions). After completing the NFC activity, the NFC controller 508 may re-establish the WLC activity by reconnecting the NFC transceiver 512 to the WLC antenna 504 and by re-establishing communication with the WLC-L counterpart. After the WLC activity has been restored, the sensing function may again be activated through the sense interface.

Figure 6:
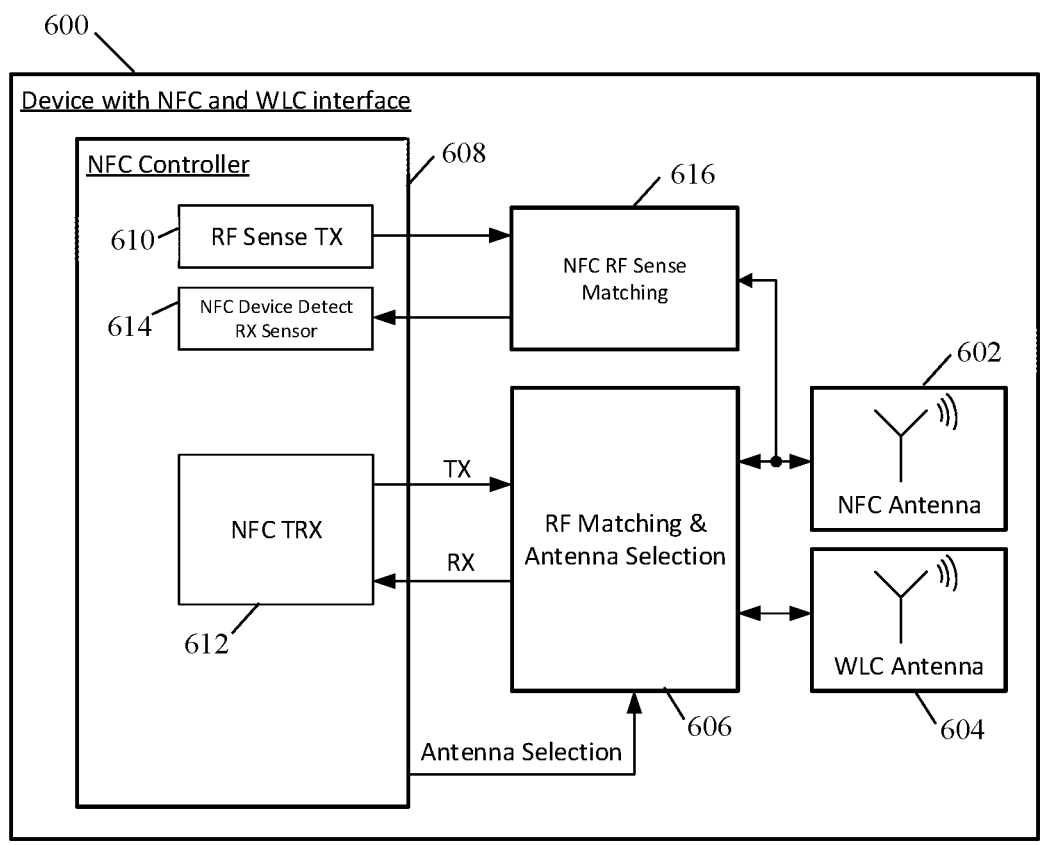
FIG. 6 shows a further illustrative embodiment of a communication device.

FIG. 6 shows a further illustrative embodiment of a communication device 600. The communication device 600 comprises an NFC antenna 602 and a wireless charging antenna 604. Furthermore, the communication device 600 comprises an NFC controller 608, which is connected to the NFC antenna 602 and the wireless charging antenna 604 through an RF matching and antenna selection unit 606. The NFC controller 608 comprises an NFC transceiver 612 configured to receive and transmit NFC signals to an external communication device (not shown), using the NFC antenna 602 and the wireless charging antenna 604. Furthermore, the communication device 600 comprises a sense interface, which in turn comprises an RF sense transmitter stage 610, an NFC device detection receiver sensor 614 and an NFC RF sense matching circuit 616. The embodiment shown in FIG. 6 facilitates detecting whether an external communication device is within communication range of the NFC antenna 602 by detecting a load change on the NFC antenna 602. More specifically, compared to the embodiment shown in FIG. 5, the embodiment shown in FIG. 6 is not only able to detect external RF fields, but also external communication devices acting in card mode like passive transponders. Accordingly, the communication device 600 is able to detect communication counterparts operating in a reader mode and/or communication counterparts operating in a (configurable) card mode, which are close to the NFC antenna 602 during an ongoing wireless charging activity.

Figure 7:
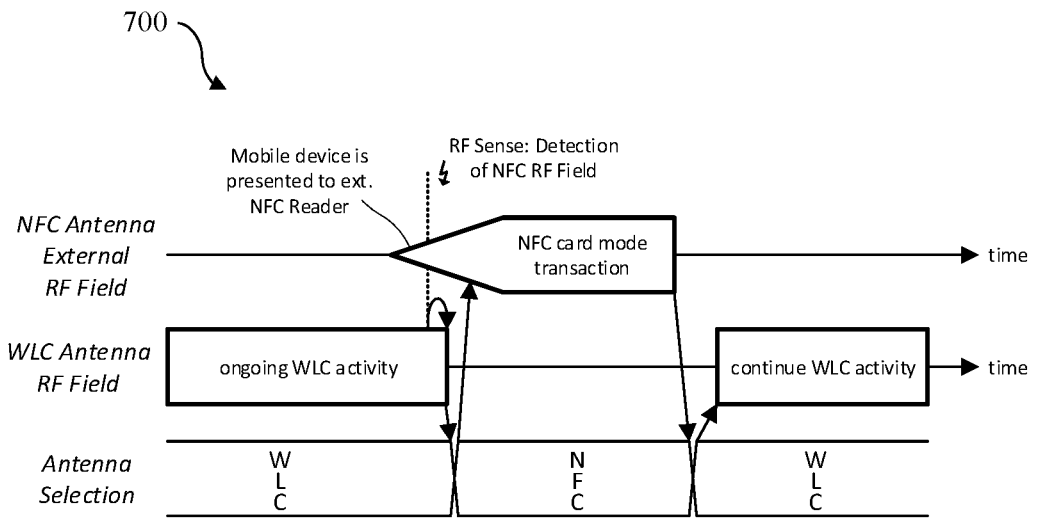
FIG. 7 shows an illustrative embodiment of a timing diagram.

FIG. 7 shows an illustrative embodiment of a timing diagram 700. In particular, FIG. 7 shows a timing diagram which illustrates the operation of a communication device of the kind set forth, when said communication device is in close proximity of an external NFC reader while it performs a WLC activity.

Figure 8:
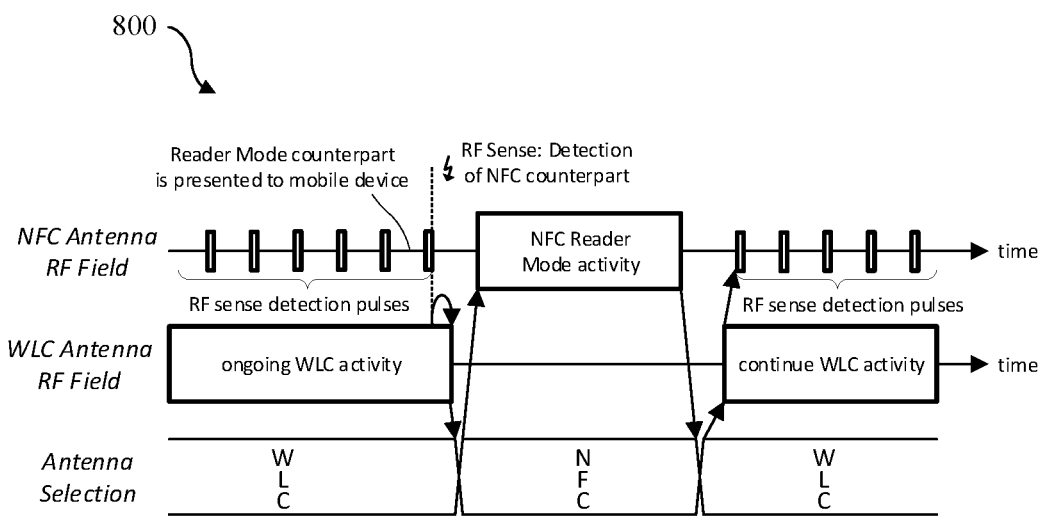
FIG. 8 shows another illustrative embodiment of a timing diagram.

FIG. 8 shows another illustrative embodiment of a timing diagram 800. In particular, FIG. 8 shows a timing diagram which illustrates the operation of a communication device of the kind set forth, when said communication device is in close proximity of an external transponder while it performs a WLC activity.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication system
102 NFC-enabled device
104 NFC antenna
106 wireless charging antenna
108 accessory device
110 reader terminal
200 communication system
202 NFC-enabled device
204 NFC antenna
208 accessory device
210 communication counterpart (tag)
300 communication device
302 first antenna
304 second antenna
306 interface including antenna selection unit
308 controller
310 additional interface
400 method of operating a communication device
402 receiving and transmitting, by a first antenna, a first set of NFC signals, wherein said first set of NFC signals relates to NFC transactions
404 receiving and transmitting, by a second antenna, a second set of NFC signals, wherein said second set of NFC signals relates to wireless charging operations
406 selecting, by an antenna selection unit comprised in a first interface between a controller and the first and second antenna, the first antenna or the second antenna in response to a selection signal received from the controller
408 detecting, by the controller, whether an external communication device is within communication range of the first antenna using a second interface between the controller and the first antenna
500 communication device with NFC and WLC interface
502 NFC antenna
504 WLC antenna
506 RF matching and antenna selection unit
508 NFC controller
510 RF sense receiver
512 NFC transceiver
514 NFC RF sense receiver matching unit
600 communication device with NFC and WLC interface
602 NFC antenna
604 WLC antenna
606 RF matching and antenna selection unit
608 NFC controller
610 RF sense transmitter
612 NFC transceiver
614 NFC device detection receiver sensor
616 NFC RF sense matching unit
700 timing diagram
800 timing diagram

The invention claimed is:

1. A communication device, comprising:
a first antenna configured to receive and transmit a first set of near field communication, NFC, signals, wherein said first set of NFC signals relates to NFC transactions;
a second antenna configured to receive and transmit a second set of NFC signals, wherein said second set of NFC signals relates to wireless charging operations;
a controller;
a first interface between the controller and the first and second antenna, the first interface comprising an antenna selection unit configured to select the first antenna or the second antenna in response to a selection signal received from said controller;
a second interface between the controller and the first antenna;
wherein the controller is configured to detect whether an external communication device is within communication range of the first antenna using the second interface.

2. The communication device of claim 1, wherein the controller is configured to detect whether the external communication device is within communication range of the first antenna by detecting the presence of a radio frequency, RF, field.

3. The communication device of claim 1, wherein the controller is configured to conclude that the external communication device is within communication range of the first antenna if the strength of said RF field exceeds a predefined threshold.

4. The communication device of claim 1, wherein the controller is configured to detect whether the external communication device is within communication range of the first antenna by detecting a load change on the first antenna.

5. The communication device of claim 4, wherein the controller is further configured to generate and transmit radio frequency, RF, pulses through the first antenna, to detect said load change on the first antenna.

6. The communication device of claim 4, wherein the controller is configured to use a transmitter supply current as a measure of the load change.

7. The communication device of claim 1, wherein the controller is configured to interrupt an active wireless charging operation if said external communication device is within communication range of the first antenna.

8. The communication device of claim 7, wherein the controller is configured to interrupt said active wireless charging operation by instructing the antenna selection unit to select the first antenna.

9. The communication device of claim 7, wherein the controller is further configured to reactivate the interrupted wireless charging operation if the external communication device is no longer within communication range of the first antenna or if a transaction with the external communication device has concluded.

10. The communication device of claim 9, wherein the controller is configured to reactivate the interrupted wireless charging operation by instructing the antenna selection unit to select the second antenna.

11. The communication device of claim 1, wherein the first interface comprises a first matching circuit and the second interface comprises a second matching circuit.

12. The communication device of claim 1, being a mobile device.

13. A method for operating a communication device, comprising:
   receiving and transmitting, by a first antenna, a first set of NFC signals, wherein said first set of NFC signals relates to NFC transactions;
   receiving and transmitting, by a second antenna, a second set of NFC signals, wherein said second set of NFC signals relates to wireless charging operations;
   selecting, by an antenna selection unit comprised in a first interface between a controller and the first and second antenna, the first antenna or the second antenna in response to a selection signal received from the controller;
   detecting, by the controller, whether an external communication device is within communication range of the first antenna using a second interface between the controller and the first antenna.

14. The method of claim 13, wherein said detecting comprises detecting the presence of a radio frequency, RF, field.

15. The method of claim 13, wherein the controller concludes that the external communication device is within communication range of the first antenna if the strength of said RF field exceeds a predefined threshold.

16. The method of claim 13, wherein said detecting comprises detecting a load change on the first antenna.

17. The method of claim 16, wherein the controller generates and transmits radio frequency (RF) pulses through the first antenna, to detect said load change on the first antenna.

18. The method of claim 16, wherein the controller uses a transmitter supply current as a measure of the load change.

19. The method of claim 13, wherein the controller interrupts an active wireless charging operation if said external communication device is within communication range of the first antenna.

20. The method of claim 19, wherein the controller interrupts said active wireless charging operation by instructing the antenna selection unit to select the first antenna.

* * * * *